(No Model.)
G. A. HYNDS.
VEHICLE THILLS.
No. 386,587. Patented July 24, 1888.
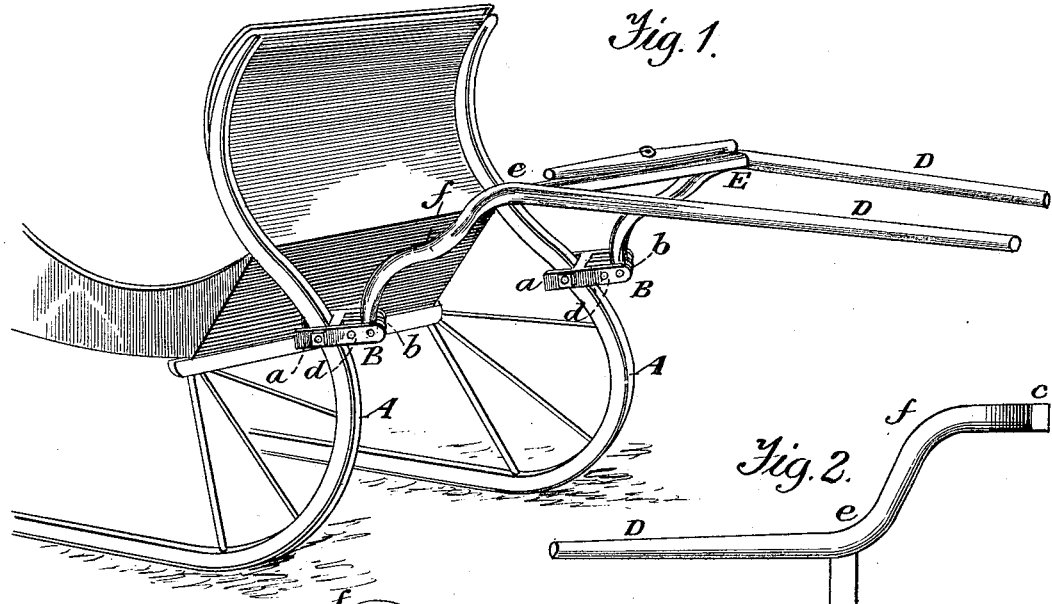
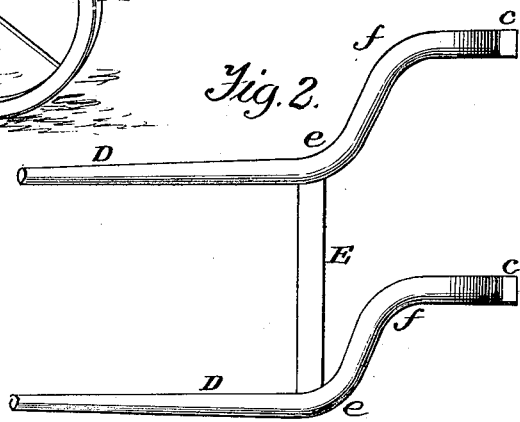
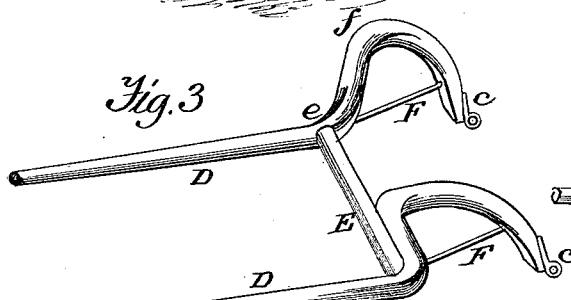
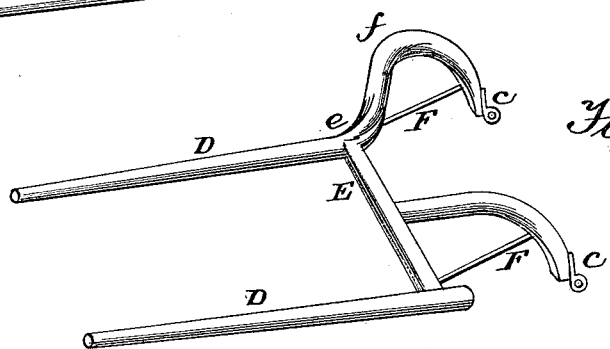
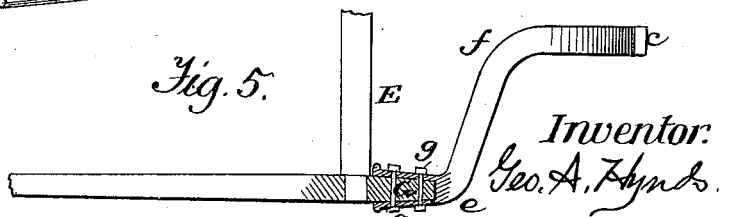
Witnesses.
A. Ruppert
Alfred T. Gage
Inventor:
Geo. A. Hynds
by Franklin H. Hough
Atty.

UNITED STATES PATENT OFFICE.

GEORGE ALEXANDER HYNDS, OF LITTLE FALLS, NEW YORK.

VEHICLE-THILLS.

SPECIFICATION forming part of Letters Patent No. 386,587, dated July 24, 1888.

Application filed March 10, 1888. Serial No. 266,899. (No model.)

*To all whom it may concern:*

Be it known that I, GEORGE ALEXANDER HYNDS, a citizen of the United States, residing at Little Falls, in the county of Herkimer and State of New York, have invented certain new and useful Improvements in Vehicle-Thills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in thills for vehicles; and it has for its object to provide cheap and light thills of that class designed to be connected with the vehicle so as to throw the horse to one side of the line of draft.

To this end, and to such others as the invention may relate, the same consists in the peculiar combinations and in the novel construction, arrangement, and adaptation of parts, all as more fully hereinafter described, shown in the drawings, and then specifically defined in the claims.

In the accompanying drawings, Figure 1 is a perspective view of a portion of a sleigh with my improvements attached thereto. Fig. 2 is a plan view of the same. Figs. 3 and 4 are modified forms of the thills. Fig. 5 is a sectional detail showing the manner of connecting the wood and metal parts thereof when the same are formed partly of metal and partly of wood.

Reference being had to the details of the drawings, A designates the front portions of the runners of a sleigh, to which are detachably secured in any suitable manner the castings B, said castings being formed with arms *a* to embrace the runner, and with arms *b*, between which fit and are detachably secured the shaft-irons *c*. There are shown in the drawings but three of these arms *b* on each casting; but this number may be varied, if desired. These arms are provided with a plurality of small holes, *d*, and the shaft-irons and bolts may be engaged with any one of these holes, as may be desired, in order to throw the shafts or thills farther away from or nearer to the runners. By shifting the shaft-irons between arms *b* to the right or left, the thills may be shifted farther to the right or left, as occasion may require.

The shafts D D may be formed of any suitable material, but preferably of wood, such as is generally used for this purpose. Instead of extending substantially in the same line from their end to the point of attachment to the runners, the shafts to the rear of their connection by the cross-bar E are provided with an offset, *e*, and from thence are curved outwardly to the point *f*, then curved inward and downward and extending in a line parallel with the portion of the shafts forward of the cross-bar, but in a different plane. The curvature of the rear portion is such as to bring the left-hand portion substantially midway between the front portions, as shown.

Instead of extending the left-hand portion, as shown in Fig. 1, the part from the offset *e* to the point *f* may be brought alongside of the cross-bar and secured thereto in any suitable manner; or the part from *e* to *f* may be omitted and the portion beyond the part *f* secured in the cross-bar by means of mortise and tenon, or in any other suitable way.

F F are braces arranged beneath the rear portion of the shafts to strengthen the same, and they may be secured thereto in any preferred manner.

Instead of forming the shafts entirely of wood, the portions to the rear of the cross-bar may be made of metal, with their forward ends tubular and tapered, as shown in Fig. 5, and the wooden parts G of the shafts shaped to fit in and be embraced by said tubular portions, and secured thereto by means of suitable bolts, *g*, as shown in the same figure.

If desired, the rear portions of the shafts from the point *f* to their rear ends may extend in a horizontal direction, instead of nearly a perpendicular one, as shown. The whiffletree is attached to the cross-bar in the usual manner.

What I claim to be new, and desire to secure by Letters Patent, is—

1. The combination, with the runners, of the castings B, secured thereto and formed with arms *b*, and the shafts having shaft-irons detachably secured between said arms, substantially as and for the purpose specified.

2. The combination, with the runners, of the castings B, detachably secured to the forward portions thereof and formed with the longitudinal arms b, provided with a plurality of holes, as shown, and the shafts provided with shaft-irons detachably secured between said arms, substantially as and for the purpose specified.

3. The combination, with the metal portions of the shafts, curved and having offsets, as shown, and formed with tubular forward ends, of the wooden forward portions of the shafts fitted and secured in said tubular portions, substantially as shown and described.

In testimony whereof I affix my signature in presence of two witnesses.

GEORGE ALEXANDER HYNDS.

Witnesses:
SMITH SANDERS,
PETER A. FLANDER.